Patented Sept. 13, 1932

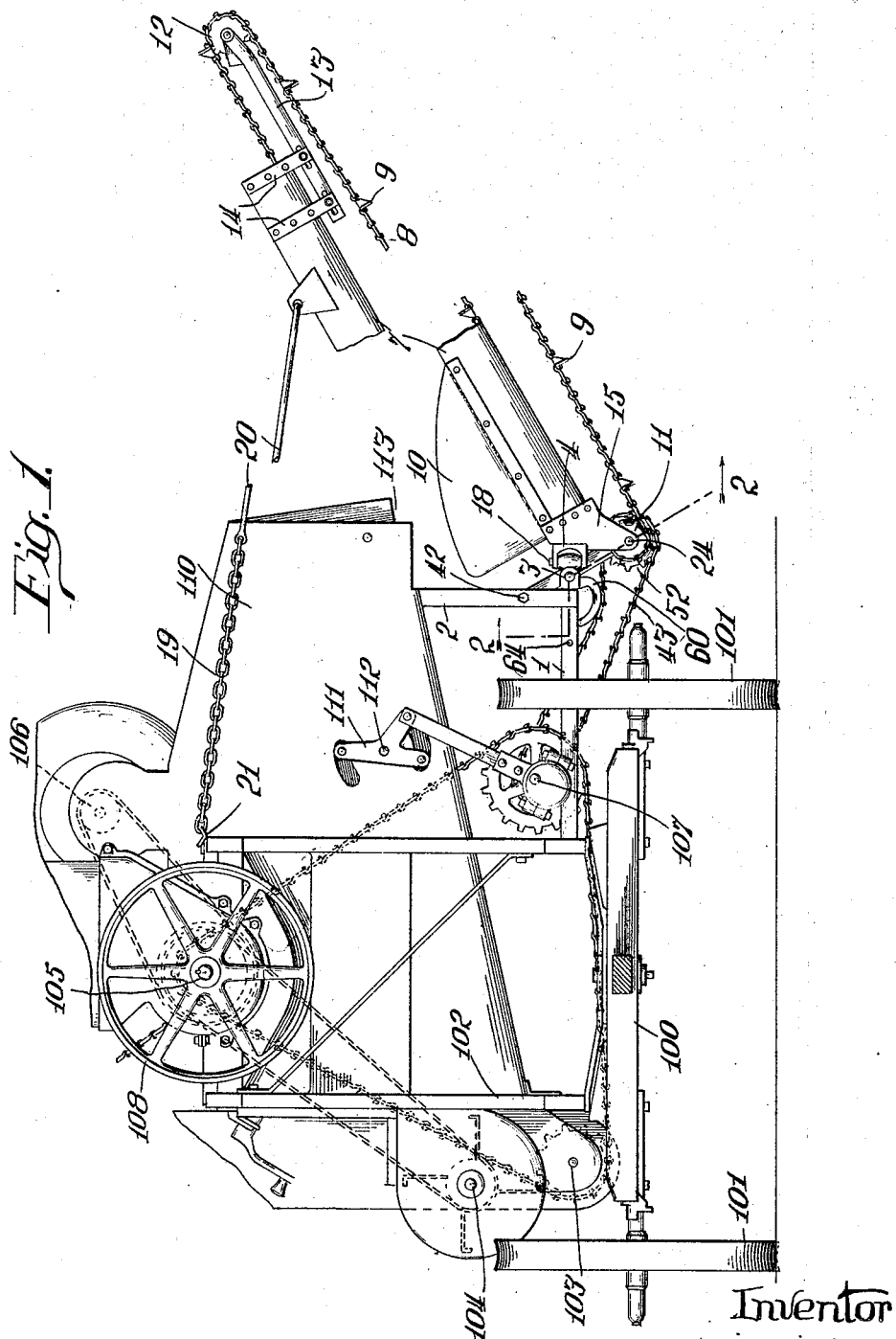

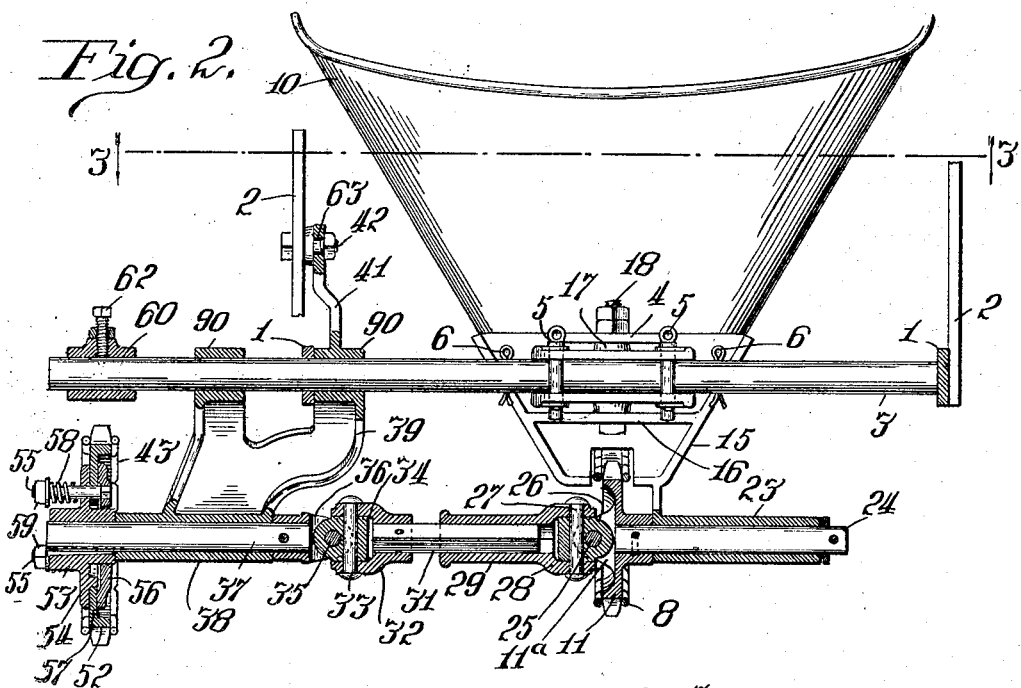
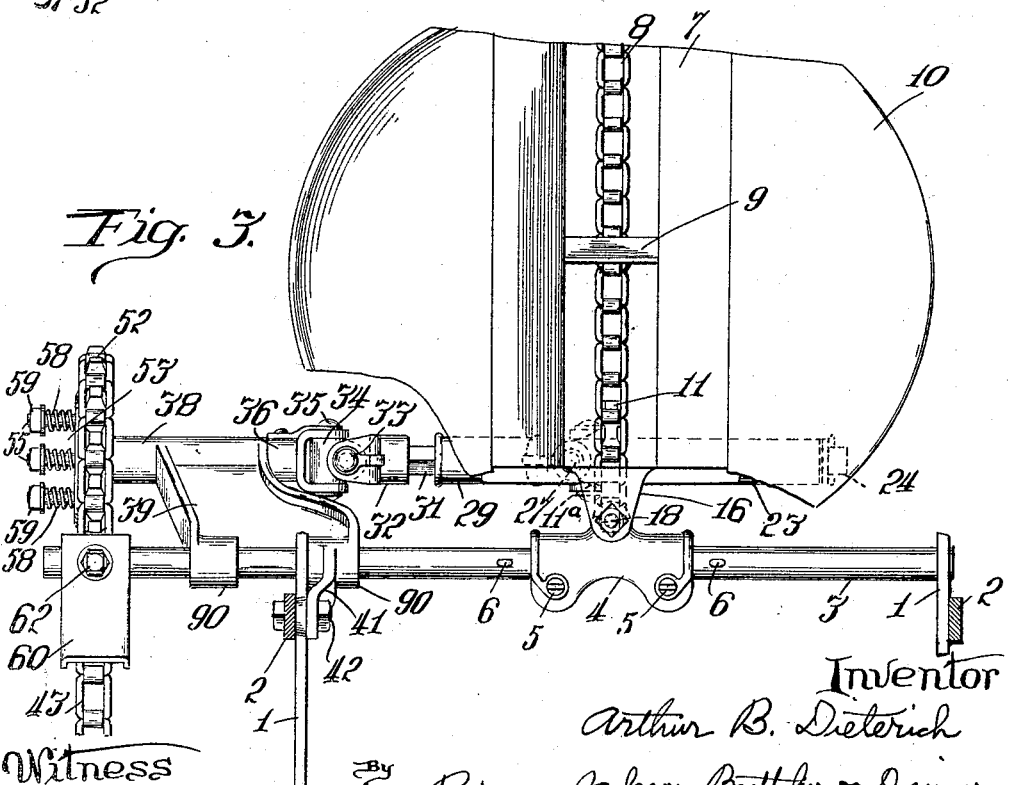

1,877,282

UNITED STATES PATENT OFFICE

ARTHUR B. DIETERICH, OF MOLINE, ILLINOIS, ASSIGNOR TO DEERE & COMPANY, OF MOLINE, ILLINOIS, A CORPORATION OF ILLINOIS

CORN SHELLER

Original application filed April 6, 1927, Serial No. 181,298. Divided and this application filed July 31, 1929. Serial No. 382,347.

My invention relates to power driven corn shellers, and more particularly to a cob stacking mechanism forming a part of such shellers.

In my copending application, Serial No. 181,298 filed April 6, 1927, of which application the present application is a division, I disclose a power driven corn sheller of improved type. Briefly the improvements so disclosed eliminate all of the bevel gears, worm gears, etc., from the sheller mechanism by mounting the instrumentalities of the sheller in such a manner that the power shafts are all parallel and driven one from the other by driving chains. The sheller comprises a frame structure mounted upon suitable wheels to permit its ready transportation from one point to another.

The several drive shafts employed to operate the units of the sheller are mounted on suitable bearings on this frame work in such a manner that the shafts are disposed longitudinally of the frame work. Moreover all of the shafts are parallel to each other.

The corn to be shelled is elevated by a suitable elevator to the top of the sheller and discharged into the shelling barrel from which the shelled corn and cobs are discharged on to the cleaning screens. The cleaning screens or shoes are disposed laterally of the frame work and oscillated laterally of the frame work, to discharge the corn through the screen into a suitable conveyor, and to discharge the cobs from the side of the machine into the cob stacker.

The longitudinal placing of all the shafts on the sheller, particularly of the main power shaft to which the driving belt from the prime mover is attached, makes the strain imposed on the machine by the belt lie parallel to the axles of the supporting wheels and at right angles to the plane of the supporting wheels. This feature makes the anchoring of the machine an easier matter, since the strain on the wheels is in the plane of the axles and does not tend to rotate the wheels about their axles.

The oscillating of the cleaning shoes causes the machine to vibrate somewhat, but since the shoes are oscillated in a lateral direction, the vibrations set up in the machine do not tend to rotate the wheels and again the anchoring of the machine is thereby made easier.

The cob stacking mechanism, which forms the subject matter of the instant application, is pivoted to the frame work of the machine at a point adjacent to the discharge end of the cleaning shoes so that the cobs discharged from the shoes are picked up by the stacking mechanism and carried away from the machine. It is necessary to swivel the stacking mechanism on the machine so that when a pile of cobs has been made the stacker can be moved and caused to discharge additional cobs to one side of the pile already made, thereby insuring that the stacker will not become clogged with cobs.

The sheller designed in accordance with the teachings of my above mentioned copending application is rather wide laterally and since the cob stacking mechanism projects laterally from the machine, it is necessary to remove this mechanism before the machine can be transported through farm gates, barn doors, etc. I have provided an improved mounting that attaches the cob stacker to the shelling mechanism, a mounting that can be quickly detached when it is necessary to remove the stacker from the shelling mechanism to permit transportation of the sheller.

The stacking mechanism comprises primarily a trough-like member along the bottom of which is disposed a chain which is equipped with cleats or flight bars for pushing the cobs along the trough. This chain is threaded around sprocket wheels disposed at opposite ends of the trough, and the sprocket wheel adjacent to the sheller is driven by a suitable connection to a drive shaft on the sheller. This drive shaft on the sheller is mounted parallel to the other shafts of the sheller, and therefore at right angles to the axles of the supporting wheels of the sheller. Since the stacker is pivotable about the frame of the sheller, the shaft supporting the sprocket wheel on the stacker will not always be in alignment with the drive shaft on the sheller, and I have therefore provided a flexible connection between the shafts, a connection which not only flexes to compensate for misalignment of the shafts, but which is also readily releasable to permit removing the stacker from the sheller mechanism. In order to acquaint those skilled in the art with the teachings of my invention, I have illustrated a preferred embodiment of it in the accompanying drawings in which:

Figure 1 is an elevational view of the sheller with the cob stacker attached thereto;

Figure 2 is a detailed cross-sectional view of the mechanism for attaching the stacker to the sheller and for driving the stacker, taken substantially along the line 2—2 of Figure 1; and Figure 3 is a plan view taken along the line 3—3 of Figure 2.

Referring now to Figure 1 in more detail, it will be seen that the sheller, which is completely disclosed in my above mentioned copending application, comprises front and rear axles 100 supported on the wheels 101, and supporting the frame work 102 of the sheller. The aforementioned parallel power shafts 103, 104, 105, 106, and 107 are mounted on this frame work by suitable bearing supports and are disposed longitudinally of the frame of the sheller and at right angles to the axles of the wheels 101. The main driving pulley 108 mounted on the shaft 105 receives the belt from the prime mover, not shown, and serves to drive all of the operating parts of the sheller mechanism through suitable chain and belt connections between the shaft 105 and the other drive shafts, all as described in my copending application. The cleaning shoes are disposed in the housing 110 and are connected to the agitating lever 111, which is oscillated about its pivot 112 to oscillate the shoes and thereby clean the shelled corn and separate it from the cobs. The cobs are discharged from the cleaning housing 110 through the opening 113 disposed at the right end of the sheller as seen in Figure 1.

The cob stacker comprises a funnel-like hopper 10 which receives the cobs from the discharge opening 113 of the cleaning housing 110, and feeds them to the stacker conveyor. The stacker conveyor comprises a trough-like member 7 in the bottom of which a conveyor chain 8 travels to carry the cobs upwardly through the trough.

The cob stacker mechanism is supported in a frame structure consisting of horizontal bars 1 extending laterally from the chassis and re-enforced by vertical struts 2. A pipe bar 3 is mounted in the ends of the horizontal supporting bars 1, and supported on the intermediate portion of the pipe bar is a swivel member 4 which supports the lower end of the stacker. This swivel member is held on the pipe bar by vertically extending pins 5 passing through upper and lower ears on the swivel member, by the removal of which pins the swivel member can be dismounted from the pipe bar. The swivel member is held against shifting along the pipe bar by cotter pins 6 releasably secured in the bar. The stacker comprises a long trough 7 in which travels the conveyor chain 8, the latter having the usual flight bars 9. The hopper 10, which is supported on the rear end of the trough, directs the cobs into the path of the conveyor chain. At the lower end of the stacker the conveyor passes over a sprocket wheel 11, and at the upper end of the stacker the conveyor passes over an adjustable sprocket wheel 12. The adjustment of this latter wheel is effected by sliding the two supporting bars 13, between which the sprocket wheel is pivoted, forwardly or backwardly relative to the hanger brackets 14 extending downwardly from the end of the trough.

A bracket 15, secured to the end of the trough 7, has a U-shaped bearing portion 16 which engages over a bearing boss 17 projecting from the swivel member 4. A pivot bolt 18 passes down through alined openings in the upper and lower arms of the U-shaped bearing portion 16 and in the bearing boss 17. The pivotal connection established by the bolt 18, together with the rotatable mounting of the swivel member 4 on the pipe bar 3, afford a universally jointed support for the lower end of the stacker, the pivot bolt 18 permitting horizontal swinging movement of the stacker from side to side and the swiveling action of the swivel member 4 permitting raising and lowering of the stacker about the axis of the pipe bar 3. The stacker is held in any adjusted position through the medium of two chains 19 which connect through links 20 with each side of the stacker adjacent its outer end. These chains are adapted to engage with hooks 21 mounted on the main frame of the machine at each side of the cleaning case, and by drawing in or paying out these chains the stacker may be raised or lowered and swung to one side or the other.

The bracket or end plate 15, secured to the lower end of the stacker trough, has a depending portion with which is formed integrally a long bearing boss 23.

Rotating within this boss is a shaft 24 on which is mounted the lower sprocket wheel 11 over which the conveyor chain travels. Projecting from one face of this sprocket wheel are two spaced lugs 11ª supporting a pivot pin 25 on which is pivoted a knuckle 26, constituting part of a universal joint in the driving train to the sprocket. Pivotally connected to this knuckle on a pivot pin 27, extending at right angles to the pivot pin 25, is the forked end 28 of a socket member 29. This member has a socket of square cross-section extending longitudinally thereof and adapted for telescopic sliding engagement over a square shaft 31. The opposite end of such shaft is pinned in a yoke 32 having pivotal connection through a pivot pin 33, with a universal knuckle 34. The latter has pivotal mounting on a pin 35, extending at right angles to the pin 33, and passing through the arms of a yoke 36 which is in turn secured to the end of the cob stacker drive shaft 37. The latter shaft is journaled in a long bearing boss 38 formed as a part of a bearing bracket 39 having swinging support on the pipe bar 3 through spaced bosses 90. When the machine is set up for operation the swinging bearing bracket 39 is fixedly held in the position shown in Figs. 2 and 3 by an arm 41 extending from the bracket and adapted to be fastened to the adjacent vertical strut 2 by a bolt 42.

The sprocket 52 which transmits power to the cob stacker drive shaft 37 is preferably of the friction slippage type, so that in the event that the cob stacker should become jammed, this sprocket wheel will slip and thus prevent breakage of the parts. The hub 53 thereof, which is keyed to the drive shaft, has a radially extending web or flange 54 which is apertured to receive spring bolts 55, such bolts extending through these apertures and having their ends anchored in a friction plate 56. The toothed periphery of the sprocket has an inwardly extending web 57 which is confined between the web 54 of the hub and the friction plate 56. The compression springs 58 on the bolts 55 serve to press the friction plate 56 and web 54 against the sides of the intermediate web 57, thus establishing a friction slippage drive between the chain 43 and the stacker drive shaft 37. By tightening or loosening the nuts 59 on the bolts 55 the sprocket may be given any desired setting for slipping at a predetermined torque. A chain tightener 60, of shoe-like form as shown in Fig. 3, is mounted on the projecting end of the pipe bar 3 for engaging with the chain 43, this chain tightener being held in any desired position on the pipe bar by a set screw 62.

It will be evident that through the flexibility of the two universal joints 26 and 34 and the telescopic shaft connection 29—31, the stacker is free to swing through a wide angle, either vertically or horizontally, without interfering with the transmission of power to its conveyor chain 8. When the machine is to be transported any considerable distance, the stacker is preferably removed, such being easily accomplished by removing the pins 5 from the swivel 4, which permits the latter to be slipped off the pipe bar 3, and then separating the telescopic drive connection 29—31. At such time it is desirable that the sprocket 52 and drive shaft 37 be swung upwardly to increase the road clearance of the machine. This is done by removing the bolt 42, then swinging the bearing bracket 39 upwardly around the pipe bar 3 to bring one of the bolt holes 63 in the arm 41 counter-clockwise into alinement with the bolt hole 64 (Fig. 1) in the horizontal frame bar 1, and then inserting the bolt 42 through these alined holes so as to hold the bearing bracket in its elevated position.

While I have shown what I consider to be the preferred embodiment of my invention, it will be understood that such embodiment is merely exemplary, and that numerous changes and rearrangements may be made therein without departing from the essence of the invention.

I claim:

1. In a corn sheller, the combination with a frame, of a cob stacker comprising a conveyor and a sprocket wheel for driving the conveyor, a bar mounted on the frame, a swivel member on said bar, on which member the stacker is pivotally supported by means of a vertical pivot, a drive shaft bearing pivotally supported on said bar, a drive shaft in said bearing, said sprocket wheel being capable of swinging movement relatively to said drive shaft, means for holding the bearing in alternative positions, and a driving connection between the drive shaft and the sprocket wheel comprising a pair of universal joints and a telescopic connection.

2. In a corn sheller, the combination with a frame, of a cob stacker comprising a conveyor having upper and lower sprocket wheels over which an endless conveying device travels, a pipe bar mounted on the frame, a swivel member detachably connected to said bar, on which member the stacker is pivotally supported by means of a vertical pivot, a drive shaft bearing pivotally supported on said bar, a drive shaft in said bearing, said lower sprocket wheel being capable of swinging movement relatively to said drive shaft, means for holding the bearing in alternative positions, and a driving connection between the drive shaft and the sprocket wheel comprising a pair of universal joints and a telescopic connection.

3. In a corn sheller, the combination with a frame, of a cob stacker comprising a conveyor and a sprocket wheel for driving the conveyor, a bar mounted on the frame, a swivel member on said bar, on which member the stacker is pivotally supported by means of a vertical pivot, a drive shaft bearing pivotally supported on said bar, a drive shaft in said bearing, said sprocket wheel being capable of swinging movement relatively to said drive shaft, means for holding the bearing in alternative positions, and a driving connection between the drive shaft and the sprocket wheel comprising a pair of universal joints and a telescopic connection, one of said universal joints being substantially in vertical alinement with the vertical pivot connecting the cob stacker and the swivel member.

In witness whereof, I hereunto subscribe my name this 26 day of July 1929.

ARTHUR B. DIETERICH.